United States Patent [19]
Liao et al.

[11] Patent Number: 6,136,909
[45] Date of Patent: Oct. 24, 2000

[54] PREPARATION OF CONDUCTIVE POLYMERIC NANOCOMPOSITE

[75] Inventors: Chien-Shiun Liao, Hsinchu; Li Kuei Lin, Hsinchu Hsien, both of Taiwan

[73] Assignee: Industrial Technology Research Institute, Hsinchu, Taiwan

[21] Appl. No.: 09/334,633

[22] Filed: Jun. 17, 1999

[30] Foreign Application Priority Data

May 20, 1999 [TW] Taiwan ................................. 88108290

[51] Int. Cl.$^7$ ...................................................... C08K 3/36
[52] U.S. Cl. ........................ 524/446; 524/442; 524/445; 524/447; 524/449; 524/451; 524/401; 524/443; 524/722; 501/3; 252/500
[58] Field of Search ..................................... 524/445, 446, 524/447, 449, 442, 451, 401, 443, 722; 501/3; 252/500

[56] References Cited

U.S. PATENT DOCUMENTS

| | | | |
|---|---|---|---|
| 5,032,547 | 7/1991 | Giannelis et al. | ............................ 501/3 |
| 5,340,500 | 8/1994 | Chao et al. | .............................. 252/500 |
| 5,414,042 | 5/1995 | Yasue et al. | ............................. 524/789 |
| 5,880,197 | 3/1999 | Beall et al. | ............................. 524/445 |
| 5,993,769 | 11/1999 | Pinnavaia et al. | ..................... 423/331 |

OTHER PUBLICATIONS

Encyclopedia of Chemical Technology, 4th Ed., vol. 6, edited by Kroschwitz et al., John Wiley & Sons, p. 393, 1996.

*Primary Examiner*—Robert Dawson
*Assistant Examiner*—Kuo-Liang Peng
*Attorney, Agent, or Firm*—Sughrue, Mion, Zinn, Macpeak & Seas, PLLC

[57] ABSTRACT

A method for producing a conductive polyaniline/layered inorganic nanocomposite having a conductivity greater than $10^{-1}$ S/cm is disclosed. The method comprises the steps of: (a) forming a reaction mixture comprising water, an aniline monomer, a protonic acid, an oxidizing agent, and a layered silicate which has been subjected to an acid treatment or is intercalated with polyethylene glycol; and (b) subjecting said reaction mixture to oxidative polymerization to form a conductive polymeric nanocomposite having said layered silicate dispersed in a polymeric matrix of polyaniline.

15 Claims, 1 Drawing Sheet

PREPARATION OF CONDUCTIVE POLYMERIC NANOCOMPOSITE

BACKGROUND OF THE INVENTION

1. Field of the Invention

The present invention relates in general to conductive polymeric nanocomposites. More particularly, it relates to a method for producing conductive polyaniline/layered inorganic nanocomposites.

2. Description of the Related Arts

Nanocomposites are a new class of materials which exhibit ultrafine phase dimensions, typically in the range 1–100 nm. Experimental work on these materials has generally shown that virtually all types and classes of nanocomposites lead to new and improved properties such as increased stiffness, strength, and heat resistance, and decreased moisture absorption, flammability, and permeability, when compared to their micro- and macro-composite counterparts.

In the past decade, conducting polymers have been used in many fields, such as batteries, displays, optics, EMI shielding, LEDs, sensors, and the aeronautical industry. High molecular weight polyaniline has emerged as one of the more promising conducting polymers because of its excellent chemical stability combined with respectable levels of electrical conductivity of the doped or protonated material. Processing of polyaniline high polymers into useful objects and devices, however, has been problematic. Melt processing is not possible, since the polymer decomposes at temperatures below a softening or melting point. In addition, major difficulties have been encountered in attempts to dissolve the high molecular weight polymer.

One known method to improve the processibility of polyaniline is by employing a protonic acid dopant containing a long-chain sulfonic group in the polymerization of aniline to form an emulsified colloidal dispersion. However, this method requires a large quantity of long-chain dopants, which decrease the conductivity and mechanical properties of polyaniline. In addition, high aspect ratios of polyaniline are unavailable through this method.

In conventional guest-host methods for preparing polyaniline/layered inorganic composites, aniline monomers are interposed between layered hosts, and then subjected to oxidative polymerization to form composites with highly ordered polymer matrices. The polyaniline composite thus obtained, however, commonly has a conductivity lower than $10^{-2}$ S/cm. Moreover, they do not give nanoscale structures. The interlayer spacing (d-spacing) of the inorganic layers is less than 15 Å.

The aim of this present invention is to provide a conductive polyaniline nanocomposite which has a conductivity of greater than $10^{-1}$ S/cm.

PRIOR ART

U.S. Pat. No. 5,567,355 discloses a conductive polymer that exists in the form of a dispersed solid made up of primary particles with a specific surface area according to BET of >15 m$^2$/g and with an average diameter of less than 500 nm. For the manufacture of the polymer the polymerization is carried out in a solvent in which the appropriate monomer is soluble or colloidally dispersible, but in which the polymer that is formed is insoluble, whereby the temperature of the reaction mixture is not allowed to rise more than 5° C. above the starting temperature.

U.S. Pat. No. 5,567,356 discloses electrically-conductive polyaniline salts that are soluble in xylene and an emulsion-polymerization process for producing the salts. The process comprises the steps of combining water, a water soluble organic solvent, a hydrophobic organic acid, an aniline monomer, and a radical initiator and allowing the mixture to form the electrically-conductive polyaniline salt of the acid.

U.S. Pat. No. 5,232,631 describes solutions and plasticized compositions of electrically conductive polyanilines in nonpolar organic fluid phases with functionalized protonic acids.

U.S. Pat. No. 5,340,500 teaches a polyaniline composite and the process for preparation of the same, wherein an inorganic macroanionic insulator is employed as the host and an oxidizing polymerization of aniline is followed under an appropriate condition.

U.S. Pat. No. 5,489,400 shows a conductive polymer composition comprises a molecular complex made by template guided polymerization and a conductive polymer.

U.S. Pat. No. 5,324,453 describes a method of emulsion polymerization of aniline or substituted anilines for making substituted or unsubstituted homopolymers and co-polymers of aniline.

SUMMARY OF THE INVENTION

It is an object of the invention to provide a method for producing a conductive polymeric nanocomposite having a conductivity of greater than $10^{-1}$ S/cm.

It is a further object of the invention to provide a method for producing a conductive polymeric nanocomposite comprising a layered silicate with a interlayer spacing of greater than 50 Å.

The method according to the invention includes the steps of: (a) forming a reaction mixture comprising water, an aniline monomer, a protonic acid, an oxidizing agent, and a layered silicate which is intercalated with polyethylene glycol or has been subjected to an acid treatment; and (b) subjecting said reaction mixture to oxidative polymerization to form a conductive polymeric nanocomposite having said layered silicate dispersed in a polymeric matrix of polyaniline.

DETAILED DESCRIPTION OF THE INVENTION

The present method for nanocomposite preparation involves oxidative polymerization of an aniline monomer in the presence of an oxidizing agent, a protonic acid, and a layered silicate which is intercalated with polyethylene glycol or has been subjected to an acid treatment.

The layered silicate suitable for used herein preferably has a cation-exchange capacity ranging from 50 to 200 meq/100 g, and can be a swellable clay material such as smectite clay, vermiculite, halloysite, or sericite; or a mica based mineral such as fluoro-mica. Illustrative of suitable smectite clays are montmorillonite, saponite, beidellite, nontronite, hectorite, and stevensite. The fluoro-mica used in the invention can be prepared by heating a mixture comprising 65–90 wt % of talc and 10–35 wt % of at least one of silicon fluoride, sodium fluoride, and lithium fluoride. The nanocomposite according to the invention preferably comprises 0.05–80 wt %, more preferably 1–30 wt %, of the layered silicate as the inorganic component.

According to the invention, the above-mentioned layered silicate is subjected to an acid treatment or intercalation of polyethylene glycol (PEG) before being employed in the synthesis of polyaniline. The acid treatment can be performed by mixing the aqueous dispersion of the layered silicate with an acid selected from the group consisting of hydrochloric acid, sulfuric acid, nitric acid, and phosphoric acid. The intercalation of polyethylene glycol can be realized by mixing the aqueous dispersion of the layered silicate with polyethylene glycol. The polyethylene glycol used herein has a molecular weight ranging from 100–50,000.

The oxidative polymerization of aniline monomers is carried out in the presence of an oxidizing agent and a protonic acid dopant. Illustrative examples of aniline monomers include aniline, anilinehydro chloride, o-anilinesulfonic acid, and m-anilinesulfonic acid. Illustrative examples of oxidants for oxidative polymerization of aniline monomers include ammonium persulfate, ferric chloride, ferrous chloride, and hydrogen peroxide. Illustrative examples of suitable protonic acids include hydrochloric acid; sulfuric acid; phosphoric acid; organic sulfonic acids such as methanesulfonic acid, camphorsulfonic acid, dodecylbenzenesulfonic acid, dinonylnapthalenesulfonic acid, and p-toluenesulfonic acid; and organic phosphorus-containing acids such as phosphoric acid ester, and diphenyl hydrogen phosphate.

According to a preferred embodiment of the invention, PEG-intercalated montmorillonite or acid-treated fluro-mica was exfoliated by polyaniline, resulting in a conductive nanocomposite having a conductivity greater than $10^{-1}$ S/cm and a interlayer spacing of greater than 50 Å.

Without intending to limit it in any manner, the present invention will be further illustrated by the following examples.

EXAMPLE 1

Figure 1A:
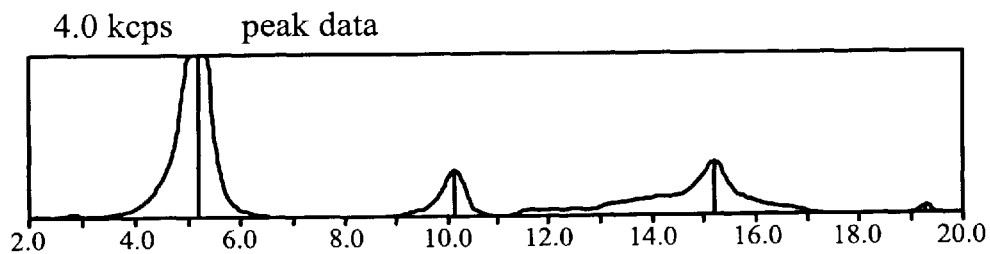
FIG. 1A illustrates an X-ray diffraction profile of PEG-montmorillonite.

Intercalation of Layered Silicate 10 g of montmorillonite powder ("Kunipia F", made by Kunimine Kogyo Co., having a cation-exchange capacity of about 120 meq/100 g) was immersed in a beaker which contained 200 ml of deionized water and a liquid suspension was obtained by stirring. A solution of 10 g of polyethylene glycol (molecular weight=3000) in 200 ml deionized water was slowly added to the liquid suspension and stirred for one hour. After standing for 30 minutes with no precipitate appearing, the mixture was stirred for an additional 2 hours. The precipitated powder was filtered, washed with water and freeze-dried. Part of this powder was analyzed using the X-ray diffraction method and, as shown in FIG. 1A, the results obtained indicate that the intercalation distance of the montmorillonite had a value (17 Å) larger than normal (9 Å). This indicates that polyethylene glycol had been included between the montmorillonite layers.

Figure 1B:
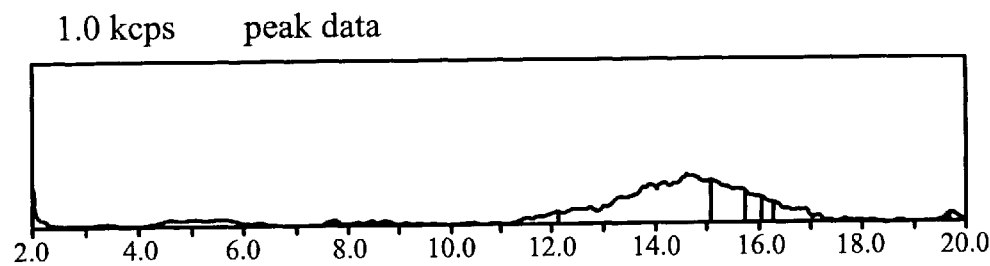
FIG. 1B illustrates an X-ray diffraction profile of a PEG-montmorillonite/polyanilne composite in accordance the present invention.

Oxidative Polymerization 2 g of the PEG-intercalated montmorillonite was added to a solution of 12 g of aniline, 18 g of methanesulfonic acid, and 120 ml of deionized water. The liquid suspension thus formed was mechanically stirred, cooled to 0° C. A refrigerated oxidant solution (0° C.) containing 24 g of ammonium persulfate in 120 ml deionized water was added dropwise to effect polymerization. After all oxidant was added (over a period of approximately 2.5 hours), the reaction was allowed to proceed at 5° C. for 4 hours by stirring at 600 rpm. A montmorillonite/polyaniline nanocomposite was obtained after filtering, water washing, and drying. The montmorillonite/polyaniline composite was analyzed using the X-ray diffraction method and, as shown in FIG. 1B, no intense peak appeared between scanning angles (2θ) 2° and 10°. This indicates that the interlayer spacing of the montmorillonite layer had a value greater than 50 Å, significantly exceeding those commonly reported in prior art (13.1–13.2 Å). The electrical conductivity of the polyaniline composite was measured using the standard four-probe method. The resulting conductivity was 1.57×$10^{-1}$ S/cm, which is about one order higher than those of prior art polyaniline/inorganic composites. A pure polyaniline prepared under the same condition had a conductivity of 2.69×$10^{-1}$ S/cm. It appeared that the conductivity was not considerably decreased by the inorganic component.

EXAMPLE 2

Acid Treatment of Layered Silicate 10 g of synthetic fluoro-mica ("Somasif ME-100", made by Co-op Chemicals, having a cation-exchange capacity of about 70–80 meq/100 g) was immersed in a beaker which contained 100 ml of deionized water and a liquid suspension was obtained by stirring. 3 ml of concentrated (98%) sulfuric acid was then slowly added and the reaction was stirred at 90° C. for 2 hours. The resulting mica powder was filtered, washed with water and freeze-dried.

Oxidative Polymerization (1)

Figure 2A:
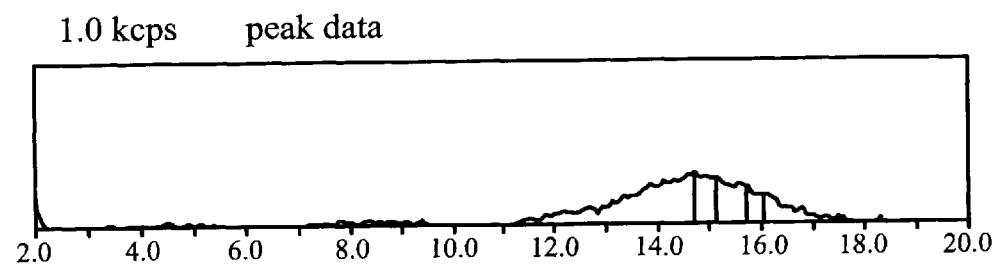
FIG. 2A illustrates an X-ray diffraction profile of a fluoro-mica/polyaniline composite in accordance the present invention.

2 g of acid-treated fluoro-mica was added to a solution of 12 g of aniline, 18 g of methanesulfonic acid, and 120 ml of deionized water. The liquid suspension thus formed was mechanically stirred and cooled to 5° C. A refrigerated oxidant solution (0° C.) containing 24 g of ammonium persulfate in 120 ml deionized water was added dropwise to effect polymerization. After all oxidant was added (over a period of approximately 2.5 hours), the reaction was allowed to proceed at 5° C. for 4 hours by stirring at 600 rpm. A fluoro-mica/polyaniline nanocomposite was obtained after filtering, water washing, and drying. The fluoro-mica/polyaniline composite was analyzed using the X-ray diffraction method and, as shown in FIG. 2A, the results indicate that the interlayer spacing of the mica layer had a value greater than 50 Å. This suggests the mica layers which had been destroyed by the acid treatment, were delaminated during the polymerization, and finally connected to polyaniline through ionic bonding. The electrical conductivity of the fluoro-mica/polyaniline composite was measured using the standard four-probe method. The resulting conductivity was 2.24×$10^{-1}$ S/cm.

Oxidative Polymerization (2)

Figure 2B:
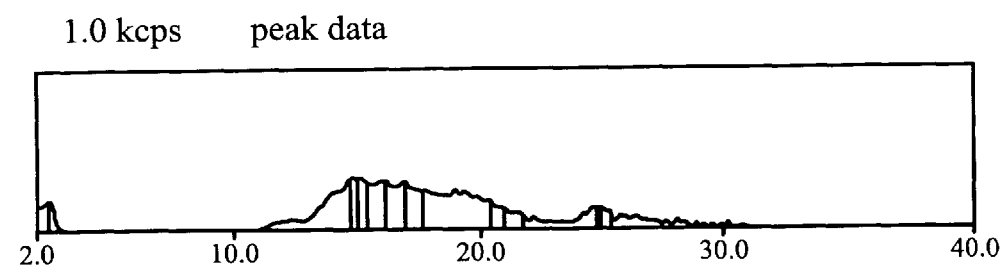
FIG. 2B illustrates an X-ray diffraction profile of another fluoro-mica/polyaniline composite in accordance the present invention.

5.5 g of acid-treated fluoro-mica was added to a solution of 32.7 g of dodecylbenzenesulfonic acid, 9.3 g of aniline, 22.8 g of ammonium persulfate, and 1,000 ml of deionized water. The reaction was allowed to proceed at 20–22° C. for 4 hours. After filtering, water washing, and drying, a fluoro-mica/polyaniline nanocomposite was obtained. The fluoro-mica/polyaniline composite was analyzed using the X-ray diffraction method and, as shown in FIG. 2B, a weak peak at 2.44° (2θ) indicates that the interlayer spacing of the mica layer had a value of about 36.2 Å. This suggests delamination of the mica layers had taken place. The electrical conductivity of the fluoro-mica/polyaniline composite was measured using the standard four-probe method. The resulting conductivity was $2.39 \times 10^{-1}$ S/cm.

While the invention has been particularly shown and described with the reference to the preferred embodiment thereof, it will be understood by those skilled in the art that various changes in form and details may be made without departing from the spirit and scope of the invention.

What is claimed is:

1. A method for producing a conductive polymeric nanocomposite, comprising the steps of:
   (a) forming a reaction mixture comprising water, an aniline monomer, a protonic acid, an oxidizing agent, and a layered silicate which has been subjected to an acid treatment or is intercalated with polyethylene glycol; and
   (b) subjecting said reaction mixture to oxidative polymerization to form a conducive polymeric nanocomposite having said layered silicate dispersed in a polymeric matrix of polyaniline, wherein said nanocomposite has a conductivity of greater than $10^{-1}$ S/cm.

2. The method as claimed in claim 1, wherein said layered silicate has a cation-exchange capacity ranging from 50 to 200 meq/100 g.

3. The method as claimed in claim 1, wherein said layered silicate is a polyethylene glycol-intercated layered silicate of smectite clay, vermiculite, halloysite, or sericite.

4. The method as claimed in claim 3, wherein said smectite clay is selected from the group consisting of montmorillonite, saponite, beidellite, nontronite, hectorite, and stevensite.

5. The method as claimed in claim 3, wherein said polyethylene glycol has a molecular weight ranging from 100 to 50,000.

6. The method as claimed in claim 1, wherein said layered silicate is an acid-treated fluoro-mica.

7. The method as claimed in claim 6, wherein said fluoro-mica is prepared by heating a mixture comprising 65–90 wt % of talc and 10–35 wt % of at least one of silicon fluoride, sodium fluoride, and lithium fluoride.

8. The method as claimed in claim 6, wherein said fluoro-mica has been treated with an acid selected from the group consisting of sulfuric acid, hydrochloric acid, nitric acid, and phosphoric acid.

9. The method as claimed in claim 1, wherein said aniline monomer is selected from the group consisting of aniline, anilinehydro chloride, o-anilinesulfonic acid, and m-anilinesulfonic acid.

10. The method as claimed in claim 1, wherein said oxidizing agent is selected from the group consisting of ammonium persulfate, ferric chloride, ferrous chloride, and hydrogen peroxide.

11. The method as claimed in claim 1, wherein said protonic acid is selected from the group consisting of hydrochloric acid, sulfuric acid, phosphoric acid, organic sulfonic acids, and organic phosphorus-containing acids.

12. The method as claimed in claim 1, wherein said protonic acid is dodecylbenzenesulfonic acid or methanesulfonic acid.

13. The method as claimed in claim 1, wherein said nanocomposite comprises 0.05–80 wt % of said layered silicate.

14. The method as claimed in claim 1, wherein the layered silicate contained in the nanocomposite has a interlayer spacing greater than 50 Å.

15. A method for producing a conductive polymeric nanocomposite, comprising the steps of:
   (a) forming a reaction mixture comprising water, an aniline monomer, a protonic acid, an oxidizing agent, and a layered silicate is intercalated with polyethylene glycol; and
   (b) subjecting said reaction mixture to oxidative polymerization to form a conducive polymeric nanocomposite having said layered silicate dispersed in a polymeric matrix of polyaniline.

* * * * *